Feb. 16, 1943.    M. L. MASTELLER    2,310,976
HYDRAULIC BRAKE
Filed Nov. 1, 1940

INVENTOR
Malcolm L. Masteller

Patented Feb. 16, 1943

2,310,976

UNITED STATES PATENT OFFICE 2,310,976

HYDRAULIC BRAKE

Malcolm L. Masteller, Miami, Fla.

Application November 1, 1940, Serial No. 363,908

2 Claims. (Cl. 60—54.6)

This invention relates to improvements in hydraulic braking apparatus and the object of the improvement is to provide means whereby the main body portions of a combined master cylinder and supply means can be turned from pipe stock, thereby enabling the elimination of the more expensive casting used in conventional master cylinders and effecting a material reduction in cost.

I attain this object by mechanism illustrated in the accompanying drawing which shows two types of combined master cylinder and supply means, both embracing the invention.

Referring to the drawing—

Like numerals refer to like parts throughout the illustrations.

Figure 1:
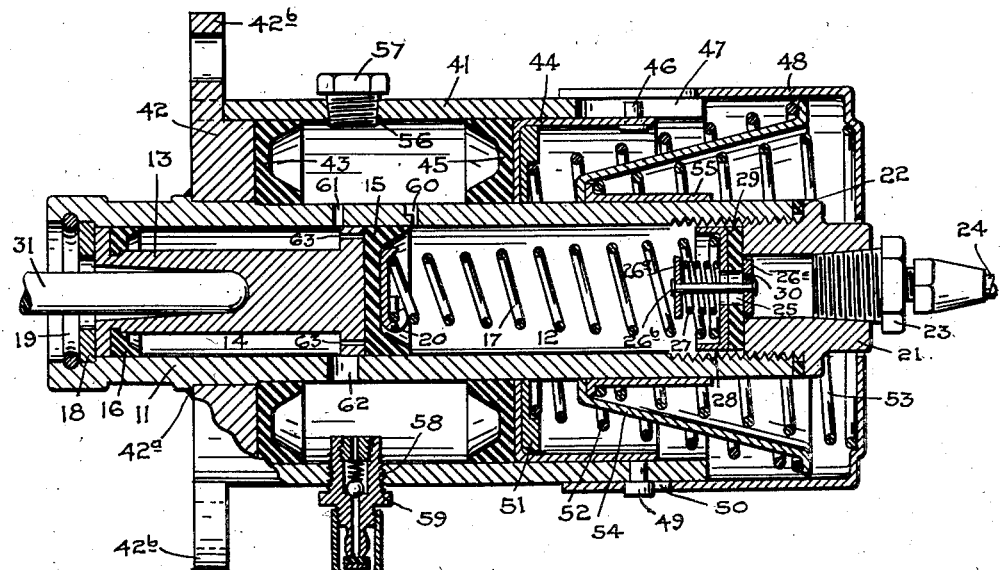
Figure 1 is a vertical longitudinal section of a combined master cylinder and spring pressed piston reservoir.

The device of Figure 1 comprises casing 11 housing chamber 12, compressor piston 13 having an annular recess forming compartment 14 between said piston and said casing, with its primary packing cup 15 and secondary packing cup 16, compression spring 17 urging said piston toward end washer 18 which is held against a shoulder in said casing 11 by retaining spring 19 which in turn is held in an annular recess in casing 11 by its own resilience, spring seat member 20, forward end closure member 21 with its gasket 22 and fitting 23 adapted for connecting conduit 24 leading to the brake; also a double acting check-valve (seated on said end closure member 21 and held in place by said compression spring 17) including an inner check-valve made up of passage 25, valve member 26a—26b—26c, and compression spring 27, permitting a free outward flow of liquid under pressure from chamber 12 and preventing its return through said passage 25, a heavier loaded outer check-valve made up of valve member 28 with its packing washer 29 seated on member 21, and compression spring 17, permitting a restricted return flow of liquid under pressure to chamber 12; and a passage 30, more fully described and claimed in my co-pending application Serial 356,808 filed September 14, 1940, now Patent No. 2,282,333, by-passing said check-valves; also actuating rod 31 which is conveniently attached to an operating crank and pedal not shown.

The above make up the master cylinder itself, and surrounding it is the spring pressed piston reservoir, features of which are more fully described and claimed in Patent Number 2,188,913 dated February 6, 1940, said reservoir being designed to maintain the liquid supply under a predetermined normal pressure throughout the hydraulic system, to be self compensating in regard to the quantity of liquid stored therein and variations in its volume due to changes in temperature, and to deliver it to the high pressure lines as required.

It comprises casing 41, head 42 which is spot-welded to casing 11 as at 42a, and has extended portions 42b to facilitate the mounting, packing cup 43 which is of the double flange variety, the outer flange engaging casing 41 and the inner flange engaging casing 11, said members 42 and 43 constituting a liquid-tight closure for one end of the supply chamber, slidable annular piston 44 with its double flange packing cup 45, constituting a liquid-tight closure for the other end of said supply chamber, said piston having a length greater than its range, enabling it to carry stop pins 46 of which there is a plurality disposed at intervals around the circumference of said piston, said pins travelling in slots as at 47 in the wall of said casing 41, and serving also to indicate the position of said piston and in consequence the amount of available liquid contained in the reservoir; cover 48 attached to said casing 41 by means of pins 49 and their bayonet-joint slots 50, which are also disposed at intervals around the circumference of the device; washer 51 which gives a greater rigidity to said piston 44 and also serves as a spring seat; and a resilient means adapted to urge said annular piston inwardly and maintain the operating liquid under a predetermined normal pressure, usually about 6 to 8 pounds per square inch, including compression springs 52 and 53 and piston-like member 54—55 which serves as a seat for said springs having a bearing on casing 11 for preventing weaving and buckling which would be inherent in a single spring of the required dimensions; bleeder vent 56 with its plug 57, and filler port 58 with its check-valve fitting 59 adapted for engagement with a pressure filling device. The liquid in the reservoir is associated with that in compression chamber 12 by means of passages 60, 61 and 62 through casing 11, and passages 63 through the head of piston 13. Passages 61 and 62 in combination enable a circulation of the operating liquid through annular chamber 14 and facilitate the elimination of air therefrom.

Figure 2:
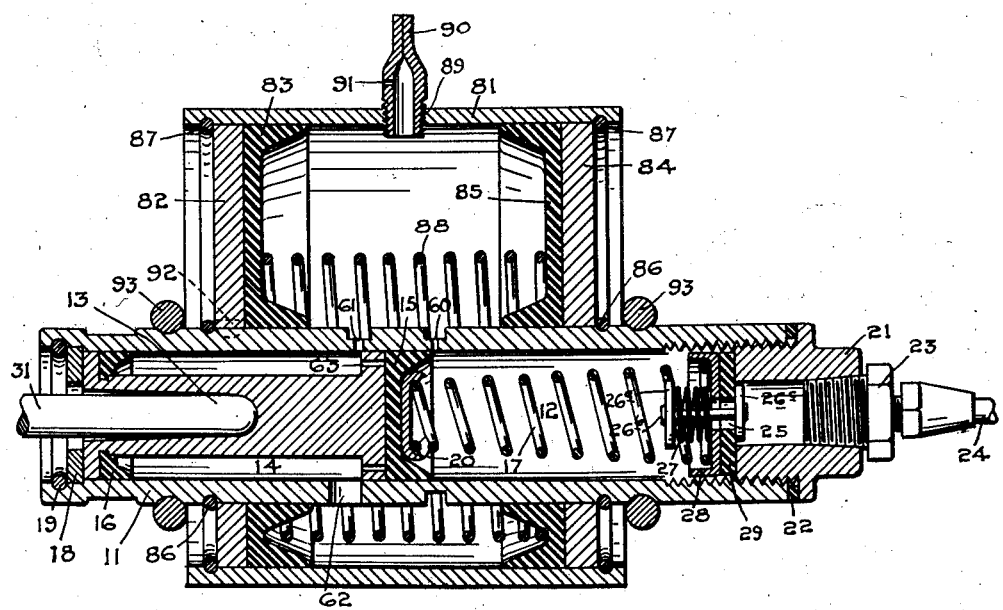
Figure 2 is a vertical longitudinal section of a combined master cylinder and reservoir for liquid at atmospheric pressure.

In Figure 2 is shown a modified form of the invention adapted to a supply means in which the liquid is not kept at a greater than atmospheric pressure. The master cylinder itself is similar to that of Figure 1, excepting that it does not have passage 30, and surrounding it is the reservoir which comprises casing 81, head 82 with its packing cup 83, piston-like head 84 with packing cup 85, said piston-like head serving as an end closure only and not being intended to slide as in the case of piston 44—45 of Figure 1, retaining springs 86 and 87 held in annular grooves in casings 11 and 81 respectively by their own resilience, compression spring 88 supporting said heads, with their packing cups, against their retaining springs 86 and 87, filler port 89 with plug 90 and its breather vent 91. Head 82 may be pressed tightly on to casing 11 or it may be slipped on and keyed as at 92 in order that it not be able to turn on casing 11. The device is mounted by means of U bolts 93.

What I claim is:

1. In a combined master cylinder and supply means wherein the supply means surrounds a portion of the master cylinder in such manner that the liquid supply forms an annular source around said master cylinder, the combination of a cylindrical casing, a closure for one end of said casing, a piston slidable within said casing for creating pressure in a compression chamber forward of said piston, a recess in said piston forming an annular chamber between said piston and said casing, a second tubular casing longitudinally surrounding a portion of said first casing and annular end closures for said second casing each including a flexible annular double flanged cup, all forming an annular supply chamber between said casings, and a plurality of passages associating said chambers with each other, substantially as described.

2. The combined master cylinder and supply means of claim 1 in which one of said annular end closures is an annular piston slidable in said annular supply chamber, associated with resilient means adapted to urge said annular piston inwardly and maintain the operating liquid under a predetermined normal pressure, substantially as described.

MALCOLM L. MASTELLER.